(No Model.)
J. F. McELROY.
ELECTRICAL CURRENT DIRECTOR.
No. 525,354. Patented Sept. 4, 1894.
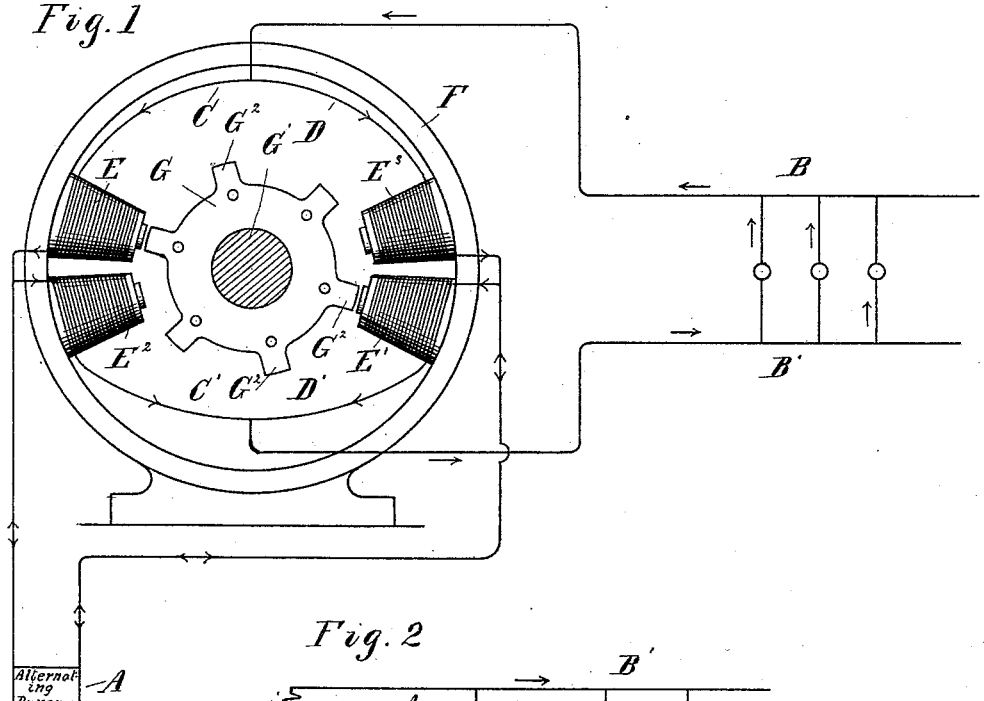
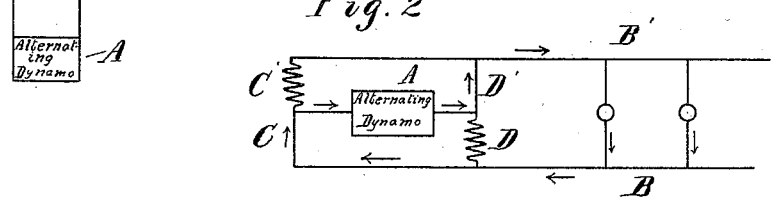
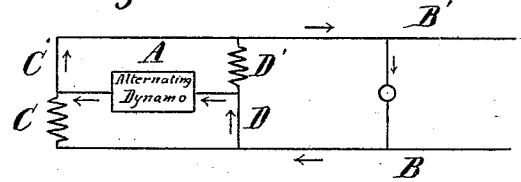
Witnesses:
P. M. Hulbert
Th. B. O'Dogherty
Inventor:
James F. McElroy
By Th. B. Sprague
Atty.

UNITED STATES PATENT OFFICE.

JAMES F. McELROY, OF ALBANY, NEW YORK, ASSIGNOR TO THE CONSOLIDATED CAR HEATING COMPANY, OF WHEELING, WEST VIRGINIA.

ELECTRICAL-CURRENT DIRECTOR.

SPECIFICATION forming part of Letters Patent No. 525,354, dated September 4, 1894.

Application filed July 1, 1891. Serial No. 398,197. (No model.)

*To all whom it may concern:*

Be it known that I, JAMES F. McELROY, a citizen of the United States, residing at Albany, in the county of Albany and State of New York, have invented certain new and useful Improvements in Current-Directors, of which the following is a specification, reference being had therein to the accompanying drawings.

The object of my invention is to provide means for directing or converting alternating into direct currents.

In the commercial production of electricity the desirability of alternating current machines in preference to so-called continuous current dynamos is well understood, as they have the advantage of greater simplicity and can be more economically operated; however a direct current is often required, as in charging secondary batteries, &c., and to obtain such a current I have devised a method of converting or directing alternating currents, whereby the whole current flows at all times and always in the same direction through the two conductors of a main circuit.

To this end my invention consists in the method hereinafter described, which broadly stated consists in connecting both poles of the alternating generator to each main conductor or each terminal of the main circuit by means of branch conductors and alternately producing in such branch conductors, electrical resistances synchronous with the current phases of the generator, whereby the current waves of like sign will always be diverted over the same main conductors in the same direction all as more fully hereinafter described.

In the drawings, Figure 1 is an elevation of a current director as preferably employed by me to effect the object of my invention. Figs. 2 and 3 are diagrams illustrating the operation of the same.

A designates an alternating current generator and B B' the main conductors forming the circuit of the dynamo. Each main conductor is connected by branches C, D and C', D', respectively with the two poles of the dynamo. In these four branches I place the electro-magnets E, E', $E^2$, $E^3$, which I arrange radially upon a circular frame F, so as to be diametrically opposite each other in pairs, and between these electro-magnets I secure an armature G which revolves upon a shaft G'. This armature is preferably made of thin laminæ of iron or steel provided with polar projections $G^2$ which revolve in close proximity to the poles of the electro-magnets, and are adapted to successively coincide in their rotation with the poles of the opposite pairs of electro-magnets and while one pair is thus connected the other pair is midway between. This armature is to be rotated in synchronism with the alternations from the dynamo A and for convenience sake may be placed upon the shaft of such dynamo itself and the winding of the electro-magnet coils is such that a current in any given direction would tend to flow through all four coils and make the poles of each pair of opposite coils of opposite sign.

The operation will be understood by considering the effects of closing or short circuiting the magnetic cores of two opposite electro-magnets by means of the polar extensions of the armature. For example if at the instant when a given current or current wave passes through the magnets the armature is in the position shown, a magnetic circuit will be closed between the magnets E E', and consequently there will be opposition to the passage of the current on account of the increased resistance of these coils due to work in charging the magnetic circuit through them; the flow of the current through the coils $E^2$ and $E^3$, however will not be opposed as the magnetic circuit through these coils is fully open at that instant and thus open paths formed from both poles of the dynamo to the main conductors B and B'. When the armature next coincides with the magnets $E^2$ $E^3$, the current alternates, and therefore the current waves of the same sign will again pass to the same main conductors.

In Figs. 2 and 3, I have represented in diagram the device, the arrows indicating the direction of the current through the branches, main line and generator, zig zag lines representing respectively in the different views the resistance coils energized as the current passes from the generator first in one and then in the opposite direction.

What I claim as my invention is—

1. The method of producing direct from alternating currents consisting in directing the alternating currents into separate oppositely extending branches constituting respectively completions of the circuits from the alternating current generator, alternately and synchronously with the alternation of the current, creating an opposing resistance in the branches and finally directing the current from one branch circuit through the main circuit, and back through the other branch circuit, substantially as described.

2. The method of producing direct from alternating currents consisting of directing the alternating current through separate oppositely extending branches of the alternating current circuit, creating an opposing resistance alternately at opposite points of the branches and finally directing the current from one branch through a main line circuit and back through the other branch, substantially as described.

In testimony whereof I affix my signature in presence of two witnesses.

JAMES F. McELROY.

Witnesses:
JOHN B. BRAIDWOOD,
ALMON C. BROWN.